(12) United States Patent
Purves

(10) Patent No.: US 11,410,460 B2
(45) Date of Patent: Aug. 9, 2022

(54) DYNAMIC LIGHTING FOR IMAGE-BASED VERIFICATION PROCESSING

(71) Applicant: VISA INTERNATIONAL SERVICE ASSOCIATION, San Francisco, CA (US)

(72) Inventor: Thomas Purves, San Fransico, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/977,212

(22) PCT Filed: Mar. 2, 2018

(86) PCT No.: PCT/US2018/020717
§ 371 (c)(1),
(2) Date: Sep. 1, 2020

(87) PCT Pub. No.: WO2019/168547
PCT Pub. Date: Sep. 6, 2019

(65) Prior Publication Data
US 2021/0012092 A1    Jan. 14, 2021

(51) Int. Cl.
*G06K 9/20* (2006.01)
*G06K 9/36* (2006.01)
(Continued)

(52) U.S. Cl.
CPC .......... *G06V 40/166* (2022.01); *G06V 10/141* (2022.01); *G06V 40/172* (2022.01); *G06V 40/45* (2022.01)

(58) Field of Classification Search
CPC . G06K 9/00255; G06K 9/00221–2009/00328; G06K 9/00899; G06K 9/00906; G06K 9/2027
See application file for complete search history.

(56) References Cited

U.S. PATENT DOCUMENTS 10,984,271 B2 *   4/2021   Langley ............... G06K 9/2027
2007/0019862 A1 *  1/2007   Kakiuchi ........... G06K 9/00906
                                                       382/190
(Continued)

FOREIGN PATENT DOCUMENTS

WO    2018013923         1/2018
WO    2018013923 A1      1/2018

OTHER PUBLICATIONS

Extended European Search Report for App. No. EP18907723.3, dated Feb. 17, 2021, 11 pages.
(Continued)

*Primary Examiner* — Brian Werner
(74) *Attorney, Agent, or Firm* — Loeb & Loeb LLP

(57) ABSTRACT

A facial recognition system may monitor a light source that causes a unique pattern of light to be projected on the subject during image capture. The lighting pattern may include intensity, color, source location, pattern, modulation, or combinations of these. The lighting pattern may also encode a signal used to further identify a location, time, or identity associated with the facial recognition process. In some embodiments the light source may be infrared or another frequency outside the visible spectrum but within the detection range of a sensor capturing the image.

14 Claims, 7 Drawing Sheets

(51) Int. Cl.
 *G06K 9/62* (2022.01)
 *G06V 40/16* (2022.01)
 *G06V 10/141* (2022.01)
 *G06V 40/40* (2022.01)

(56) References Cited

U.S. PATENT DOCUMENTS

| | | |
|---|---|---|
| 2015/0326842 A1 | 11/2015 | Huai |
| 2016/0019421 A1* | 1/2016 | Feng .................. G06K 9/00617 382/117 |
| 2016/0292536 A1 | 10/2016 | Irie |
| 2016/0350582 A1 | 12/2016 | Ueda |
| 2017/0091943 A1 | 3/2017 | Pan et al. |
| 2017/0254932 A1 | 9/2017 | Huang et al. |
| 2017/0308734 A1 | 10/2017 | Chalom et al. |
| 2019/0073533 A1* | 3/2019 | Chen .................. G06K 9/00604 |

OTHER PUBLICATIONS

Anonymous: "Color calibration—Wikipedia", Sep. 16, 2017 (Sep. 16, 2017), XP055772049, Retrieved from the Internet: URL:https://en.wikipedia.org/w/index.php?title=Color_calibration&oldid=800971847 [retrieved on Feb. 3, 2021], 4 pages.
Anonymous: "Light meter—Wikipedia", Dec. 7, 2017 (Dec. 7, 2017), XP055772055, Retrieved from the Internet: URL:https://en.wikipedia.org/w/index.php?title=Light_meter&oldid=814164881, 9 pages.
Anonymous: "Image gradient—Wikipedia", Jan. 19, 2018 (Jan. 19, 2018), XP055772077, Retrieved from the Internet: URL:https://en.wikipedia.org/w/index.php?title=Image_gradient&oldid=821304762 [retrieved on Feb. 3, 2021], 3 pages.
PCT International Search Report and Written Opinion for PCT/US18/20717 dated May 15, 2018 (19 pages).

* cited by examiner

DYNAMIC LIGHTING FOR IMAGE-BASED VERIFICATION PROCESSING

CROSS-REFERENCE TO RELATED APPLICATIONS

This application is a national stage entry under 35 U.S.C. § 371 of International Patent Application No. PCT/US18/20717, filed on Mar. 2, 2018, and designating the United States, the entire contents of which are incorporated herein by reference.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Image-based verification processes, particularly facial recognition, has become a more recognized biometric authentication process. However, as higher resolution image and video capture have become more accessible there is an increased risk of image spoofing or a replay of a previous authentication session.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

An image verification process, such as a facial recognition process, may include control of a light source or may include data about the lighting in an environment. The expected lighting conditions at the time of an image capture may be used to adjust the captured image prior to comparison with a known, registered image. When the expected and observed lighting conditions match the likelihood is increased that the image data is current and possibly that it matches the known lighting conditions at the purported location of the image capture. The use of a controllable light source allows the ambient light, or a specific pattern to be set proactively so that the captured image may be evaluated for the presence of the expected ambient light or pattern. The imposition of expected lighting conditions helps to ensure a live environment at the point of image capture and that an image is not simply a replay of previous session or a two-dimensional image being placed in the camera field of view. In an embodiment, as an image is captured, the light source may be modulated in a specific fashion to further minimize the risk of a replay attack. Different lighting conditions may include light direction, light intensity, and light color. The lighting conditions may be used to illuminate the subject in a way that causes the image to have unique and identifiable traits for verification. In an embodiment, the light source may encode data into the lighting pattern as a further verification of location or a timestamp, among others.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Identification systems of all kinds rely on the actor in the identification to be present and engaged. "Something you know" (e.g. passwords), "something you have" (e.g., a token generator), and "something you are" (e.g. fingerprint, facial or retina recognition) modes of identification all assume that the "you" in these schemes is present and engaged. For example, a system requiring a password assumes that the password holder is the person entering the information. However, if compromised, the password will give access to information to whomever holds the password. "Something you have" works as long as the key fob or other token generator is in the correct hands. Biometric identification is susceptible to replay attacks where a record of a previous session is recorded and inserted between a sensor and the device receiving the data from the sensor. Biometric identification is also susceptible to spoofing, such as fake fingerprints or, in the case of a facial recognition system, the presentation of photographic images or even holograms instead of a live target. In another case, even an authorized person may be attempting to access a system from an unexpected or unauthorized location in an attempt to commit a fraud.

Knowledge of the expected lighting in an environment, or the ability to control the lighting in the environment, can help distinguish a real person or place from a photograph or may help recognize an authorized person in an unexpected environment. When lighting conditions, such as light color, light temperature, and intensity are known, for example in a retail store where the ambient lighting may be well characterized, the lighting in an image may be used to provide additional verification of the location of the person seeking authentication.

In more sophisticated embodiments, one or more lighting sources may be controlled to provide a specific lighting configuration. The color, intensity, pattern, location, or other aspects of the ambient light may be controlled so that when the image, or images, of the target object are captured, the image must include the expected ambient light conditions in order for the actual image verification to succeed.

Figure 1:
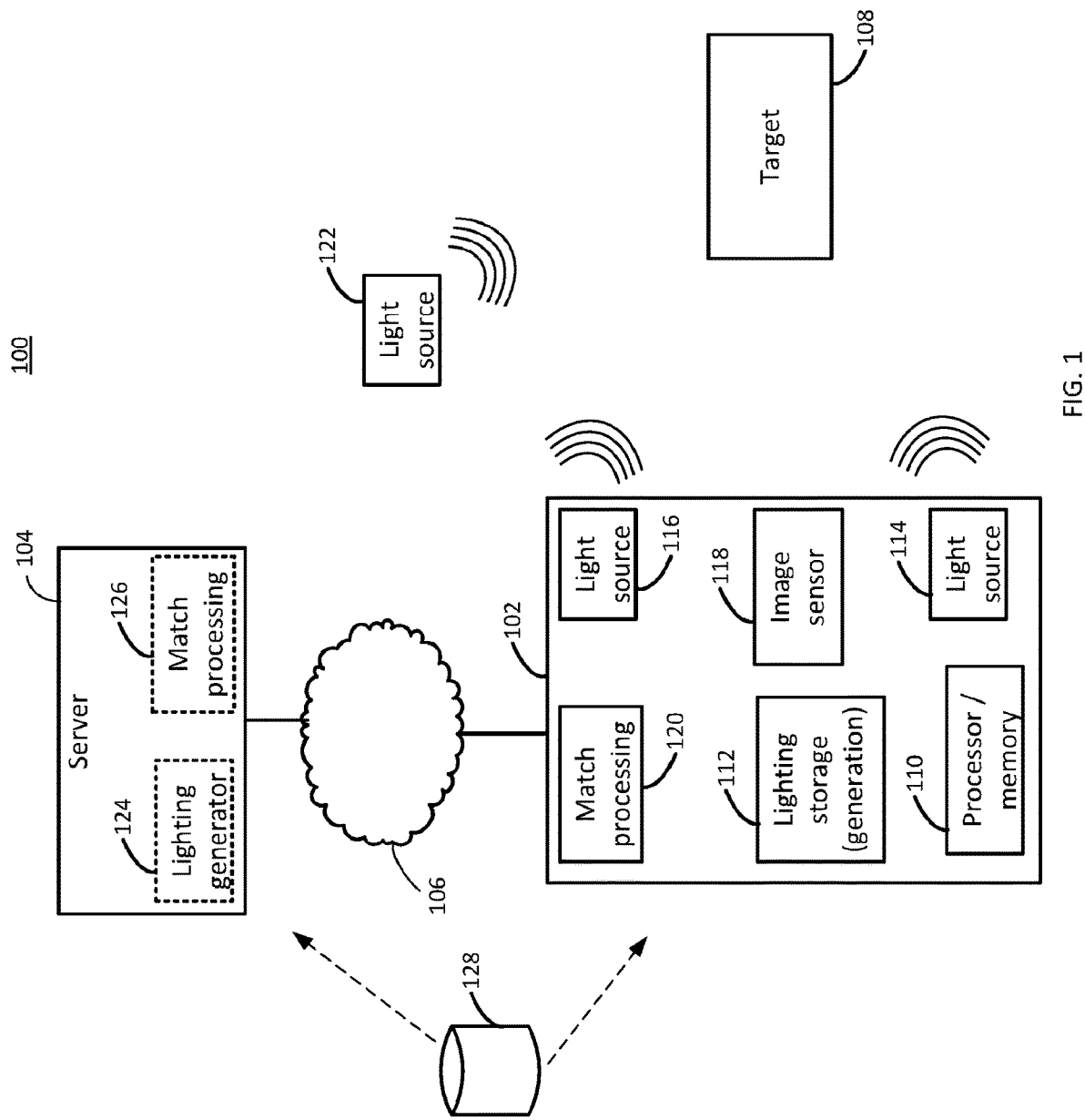
FIG. 1 is a block diagram of a system for dynamic lighting in an image-based validation process in accordance with the current disclosure.

FIG. 1 illustrates a system 100 for use in biometric authentication, particularly image authentication. While the system 100 may be suitable for facial recognition, the techniques described are not limited to facial biometric authentication but may be used for any image-based verification process where confirmation of real-time presence is desired. The system may include a capture device 102 and a server 104 coupled by a network 106 in order to support evaluation of a target object 108. The capture device 102 may include a processor and memory 110 and a lighting storage module 112. In some embodiments, the lighting storage module 112 may include the ability to generate lighting configurations, as discussed more below.

One or more light sources 112, 114 may be controlled by the processor/memory 110 according to lighting configurations received from the lighting storage module 112. In an embodiment, an external light source 122 may be controlled by the processor/memory 110 according to lighting configurations received from the lighting storage module 112. In another embodiment, the external light source 122 may be independent of the processor/memory 110 but the characteristics of the light source 122, such as, but not limited to, location and type of light, may be stored in system 100 and may be used when evaluating an image or video of the target object 108. The use of the external light source 122 may expand the choices for lighting configuration by, for example, making it possible to selectively illuminate only part of the target object, as discussed more below.

The server 104 may include a module 124 for generating lighting configurations as well as a matching module 126 for match processing once an image has been captured. In various embodiments the match processing 126 may operate instead of the local match processing 120 on the capture device 102. Similarly, lighting configurations may be generated at module 112 on the capture device 102 or may be generated at the server module 124. There is no requirement that both functions are performed at the same entity, either both on the capture device 102 or both on the server 104. A database 128 of registered images may be available to whichever of the capture device 102 or server 104 performs the match processing. The registered images may be submitted during a registration process that allows an image to be associated with a particular user's identity. In various embodiments the registration process may be performed by a business or agency for which access is sought, or may be performed by a user in order to help secure access to the user's personal information. In an embodiment, the database 128 may be contained in a secure element of the capture device 102, a secure storage device on the server 104, or a separate location that can ensure protected access.

In operation, in one embodiment, a person may enroll on a trusted device so that the person's image is captured in a neutral lighting condition. The image may be signed by a trusted party as part of the authentication process. The image may then be stored in a suitable location such as on the capture device 102, on the server 104, or at the database 128.

Subsequently, authentication of the person may be requested, either by the person or by an entity to which the person is requesting access. The request may be made via a user interface of the capture device 102 or at another terminal type, as discussed more below. In two distinct non-limiting scenarios, the user may be requesting access to information stored at the capture device 102 or for access to information stored at a remote device for which the server 104 is a gatekeeper. In either case, access may be granted by either the server 104 or the capture device 102 depending on the roles each plays and the ability to secure the authentication process.

To begin the authentication process, a request may be made for a lighting configuration. In various embodiments, the lighting configuration may be generated in real time or may be selected, ideally at random, from a predetermined set of lighting configurations. The lighting configuration generation process may take into account the capabilities of the lighting sources 114 and/or 116 and/or 122 in terms of intensity range, color range, angle to the target object, etc. In addition, the generation of the lighting configuration may as well as take into account the capabilities of the image sensor 118. For example, if both the lighting source 114 and the image sensor 118 can operate in the infrared range, more options using infrared light may be available for choosing a lighting configuration.

After receiving a lighting configuration, the processor/memory 110 may cause the light sources, separately or in combination, to illuminate the target object 108, which in an embodiment may be the subject person. However, in an alternate embodiment, the target object need not be a person. For example, a case may require verification of current, real-time, possession of an object, so that a QR code or physical object, such as returned goods, may be authenticated using the dynamic lighting configuration approach described herein.

The image sensor 118 may then capture the image of the target object 108. In an embodiment, a single image may be captured having a single factor of lighting, such as light intensity, or may use a combination of multiple factors such as color and intensity of both internal light sources 114, 116 as well as any external light sources 122. In another embodiment, a sequence of images may be taken as a sequence of lighting configurations are used to provide different illumination of the target object 108. The processor/memory 110 coordinates the illumination of the target object 108 with the capture of the single image or the sequence of images. A sequence of lighting configurations including changes to color, light intensity, source location, or pattern may not only increase the difficulty of spoofing but may be used to encode data such as a time or location so that an additional verification element may be added to the same process. For example, a one-time code of a color sequence may be used to encode a time of day or a date.

The image may be delivered to a matching process 120 or 126 depending on the system design. As discussed above, a sequence of images may be captured and sent for analysis but for the sake of clarity only a single image will be discussed herein except where the process diverges. The captured image may be encrypted, signed, or both.

After receipt at the match processor 120, 126, the image may be decrypted and when used, the signature verified. In an embodiment, the match processing may include subtracting the expected effect of the dynamic lighting to obtain a neutral image. For example, if one side of the target object was expected to be brightly lit and the other side darker, gamma curve adjustments, based on the expect lighting, may be applied to reduce the brightness of the first side and increase the brightness of the second side. If the originally captured image is authenticate and as expected, the brightness adjustments will bring the image back to a neutral light base so that, for example, a facial recognition process may be applied to compare the resulting image with the registered image. If the received image is a replay or simply a two-dimensional photograph of the real person, the gamma adjustments to each side will result in an image not in a neutral light, but with one side dramatically darker than the other. In this case, the image matching will fail because at least some required feature details will hidden in shadow, washed out, or both.

Similar photographic adjustments may be made for color. When a pattern is projected, as discussed further below with respect to FIG. 7, parts of the registered image may be blocked out according to the pattern and the matching process may be performed on the partial images.

Similarly, when a sequence of images is taken, each of the images in the sequence may be adjusted and compared to the registered image. However, in an embodiment, each image in a sequence may be analyzed for the presence of the expected lighting, e.g., color or brightness, but only one of the images from the sequence may be used for matching to the registered image. Using this technique, one image of the sequence may be taken with neutral lighting so that no adjustment is needed for matching, but the remaining images may be used to confirm real-time presence of the target object. In yet another embodiment, a video or sequence of images may be analyzed separately from the image of the target object. In such an embodiment, the verification includes verification of the lighting configuration and then verification of the image, with or without post processing of the image. In a video-based system, a live stream may be sent for lighting configuration matching, in some cases in real time.

When the matching process succeeds, a notification may be generated that the target object was both verified for identity and that the image was genuine and not a replay of a previous session.

Figure 2:
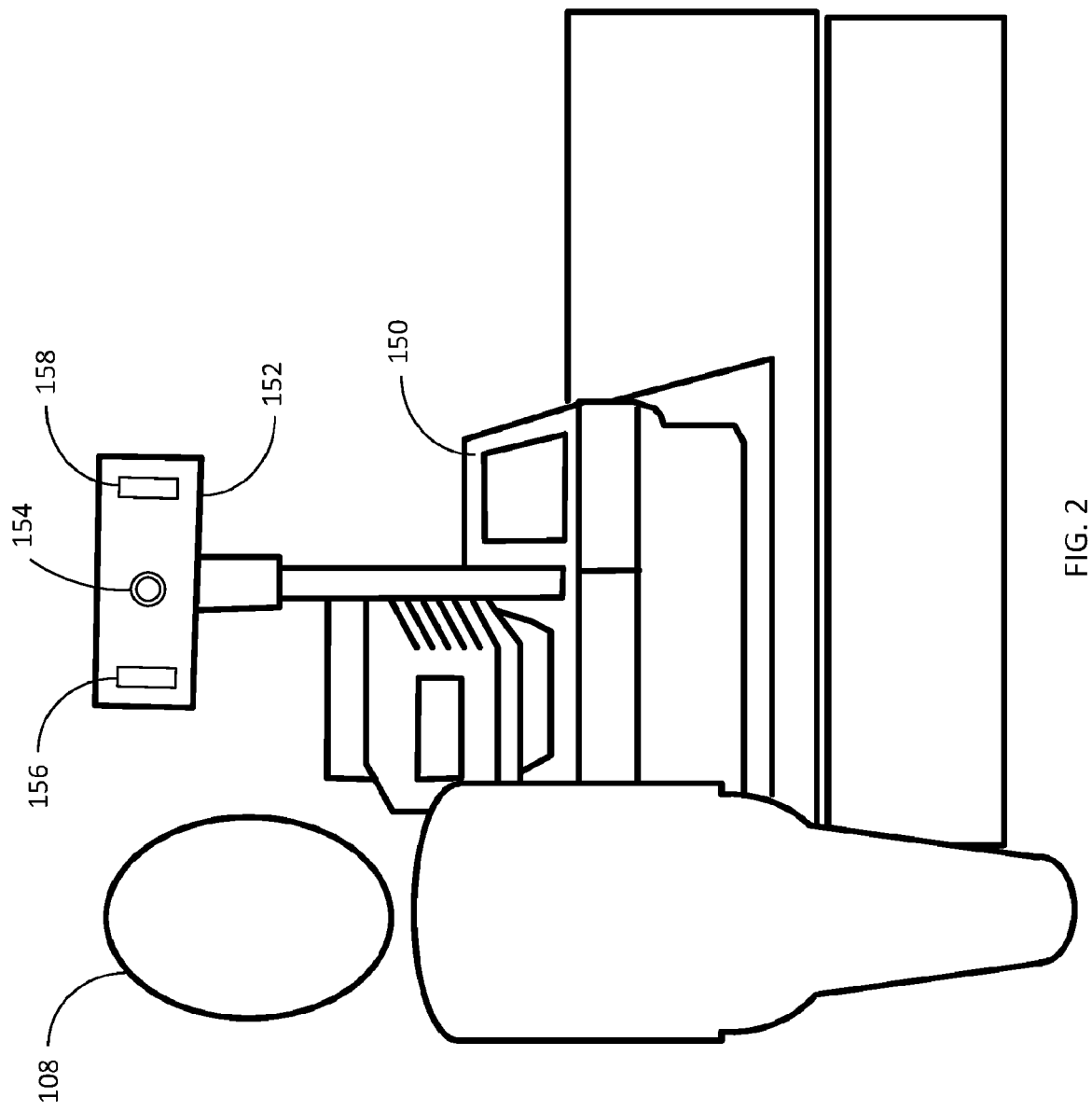
FIG. 2 is an illustration of a point-of-sale based embodiment of the system of FIG. 1.

FIG. 2 is an illustration of an embodiment supporting dynamic light encoding for image capture. A target object 108, in this case a person, is illustrated at a point of sale (POS) device 150. The POS 150 may include a capture device 152 including an image sensor 154, a first light source 156 and a second light source 158. In this embodiment, the person may wish to use a facial biometric to complete the transaction. In an exemplary case, a server, such as server 104 may be operated by a responsible party such as a transaction processor, a financial network, an issuer, etc. The server 104 may provide the lighting configuration to the capture device 152 where the illumination of the subject and subsequent image capture takes place. When the process described above succeeds, the responsible party may authorize the transaction, either using a financial instrument present at the time of the transaction or using a financial instrument designated ahead of time by the person.

Figure 3:
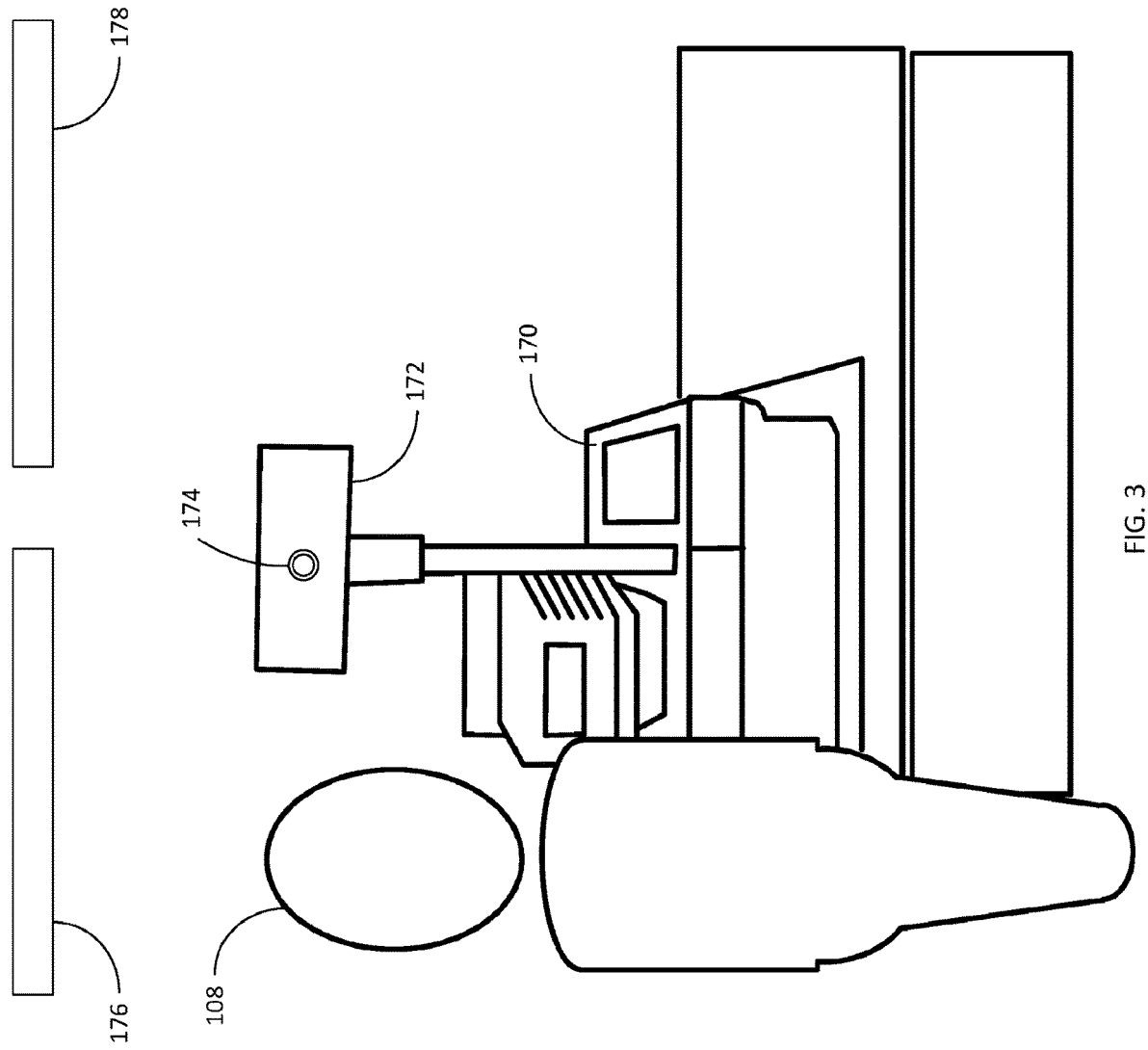
FIG. 3 is an alternate embodiment of a point-of-sale based system of FIG. 1.

FIG. 3 may be similar to the embodiment described in FIG. 2 with a POS 170 including a capture device 172 and an image sensor 174. The external lights 176 and 178 may not be controllable but may simply represent the background lighting in the store. In this case, the match processing 120, 126 may have previous knowledge of these lighting characteristics and evaluate the lighting in the captured image to confirm intensity, color, temperature, etc. as part of the matching process. While this may not be as secure as a managed illumination technique, the ability to confirm an environment may reduce attempts to fraudulently spoof a POS.

In an embodiment, the external lights 176, 178 may be modified to provide additional data. For example, lights near the checkout area may include an infrared source detectible by the image sensor 174. The infrared sources may output a coded signal, such as a pseudo-random pattern that changes on a regular basis, such as every minute. In this way, a sequence of images, or video, may allow the location of the image capture to be verified independently from other information received via the POS 170.

Figure 4:
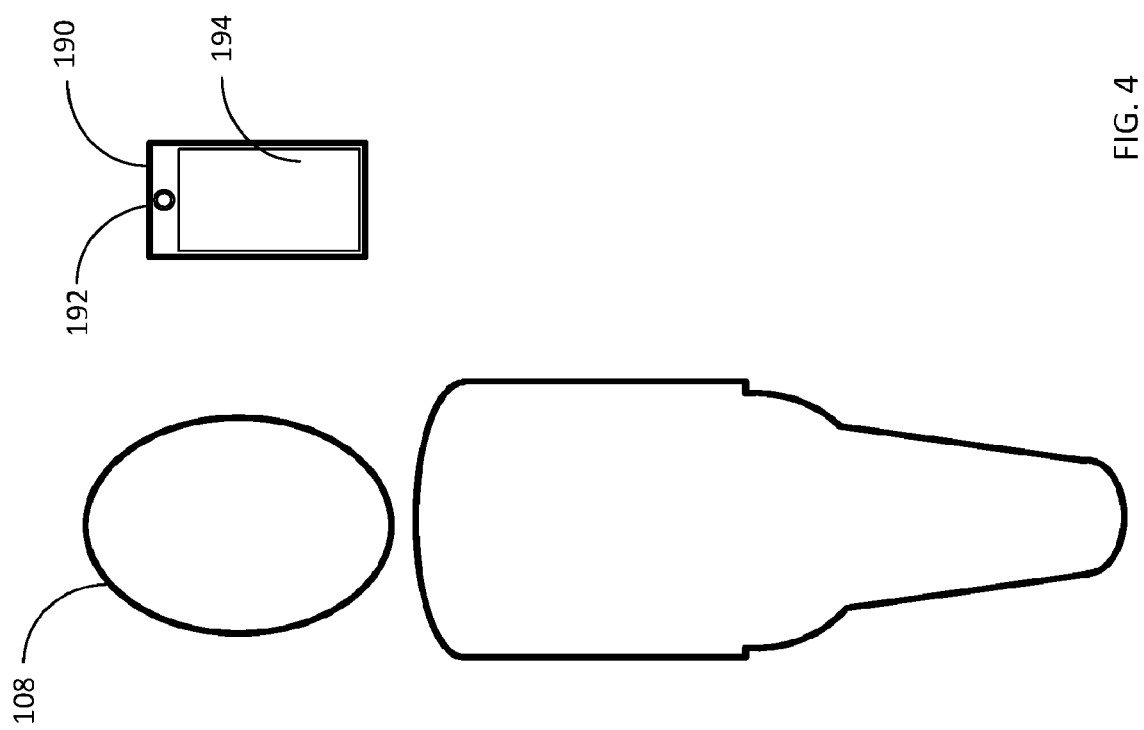
FIG. 4 is a smartphone based embodiment of the system of FIG. 1.

An illustration of another embodiment for use of the disclosed technique for dynamic illumination of a target object 108 is shown in FIG. 4. A smartphone 190 may be programmed to coordinate operation between the display 194 and the image sensor 192 (or camera) of the smartphone 190 to provide the dynamic lighting such as changing color and light intensity while capturing an image of the target object 108 such as a person, three-dimensional object, or two-dimensional object. As opposed to a simple selfie, in this embodiment a person operating the smartphone 190, whether the target subject or not may only be responsible for following directions according to the smartphone application responsible for the actual process.

For example, a user may request access to secure storage area on the smartphone 190. An application, for example, a modified lighting storage/generation program 112, may be invoked on the smartphone 190 that takes over control of the smartphone 190 to then request and receive, or generate, a lighting configuration. The lighting configuration may be received or generated via the application 112 itself or from server 104 via the lighting generator 124. The user may be instructed via voice or instructions displayed on the display 194 to position the smartphone 190 relative to the target object 108. In an embodiment, the application 112 may also confirm position of the target object 108 by, for example, confirming a face in the field of view of the image sensor 192. The application 112 may then cause the display 194 to light up according to the lighting configuration and while maintaining the lighting configuration, to capture an image using the image sensor 192.

The image and lighting configuration may be securely provided to the local match processor 120, or in some embodiments, the server match processor 126. When both the lighting configuration and the image are confirmed, the requested access may be granted. If either fails, the requested access may be denied.

In one embodiment, the smartphone 190 may be used for target object verification in a retail environment. In this case, the external lighting conditions, or specific lighting modulation schemes discussed above with respect to FIG. 3 may be used as a further aspect of verification based on a simple image or video capture.

Figure 5:
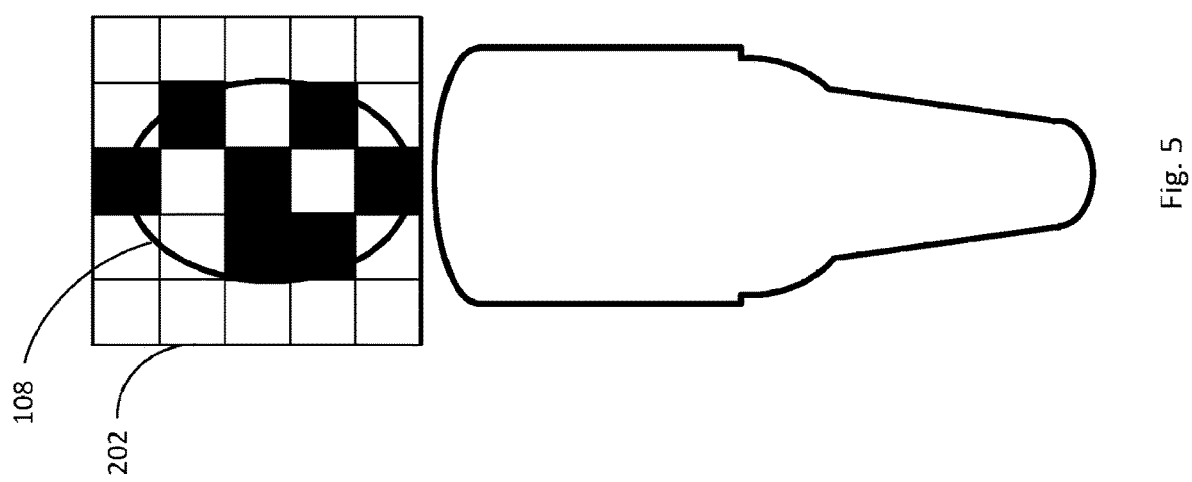
FIG. 5 illustrates a projected lighting configuration appropriate for use with an embodiment of the system of FIG. 1.

FIG. 5 illustrates the use of a pattern, previously mentioned. In such an embodiment a light source 114 may be capable of not simply projecting a diffuse light but of projecting a pattern 202 that may include one or both of different intensities and colors. For example, the light source 114 may be a projector with a lens allowing a focal point on the target object 108. As discussed above, the use of the pattern provides a more sophisticated way to alter the captured image but also requires the ability in the matching process to create a corresponding mask for the registered image that duplicates the expected pattern. In one embodiment, only the data in the lighted areas may be forwarded from the capture device 102 to the matching process, e.g., matching process 126. This further aids in preventing a replay attack because not all the usable data may be sent to the server 104 in a single transaction.

Alternatively, if the pattern is color-based rather than dark and light, the received image may also be color adjusted according to the expected pattern and matched to the registered image as described above. In a similar variation, the pattern may be in the infrared range so that the image as-captured may show the lighting pattern, which can be evaluated for correctness during the matching process.

There are numerous ways to perform image matching, such as Scale Invariant Feature Transform (SIFT) and Speeded Up Robust Feature (SURF) that compare features of images and determine a match when a correlation metric reaches a predetermined threshold value.

Figure 6:
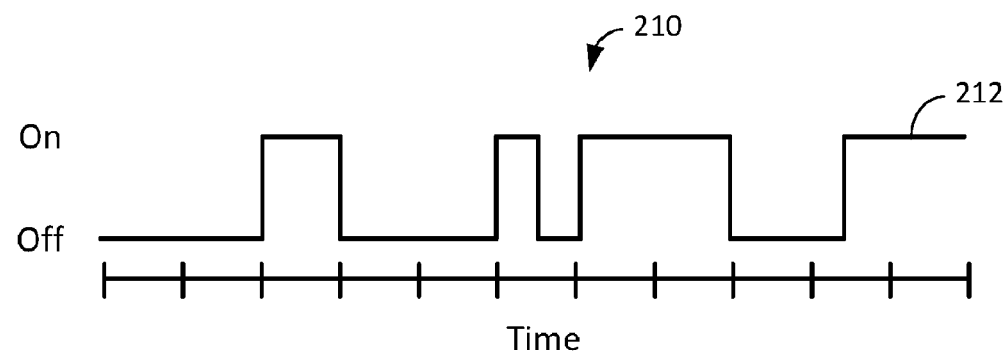
FIG. 6 is a diagram illustrating a lighting configuration.

FIG. 6 is an illustration showing a time-varying lighting configuration 210 based on a pure binary (on/off) light output. In this example, a curve 212 describes a sequence for driving a light source, such as light source 114. The sequence of images captured may use the pattern for both validation and to code a value into the sequence.

Figure 7:
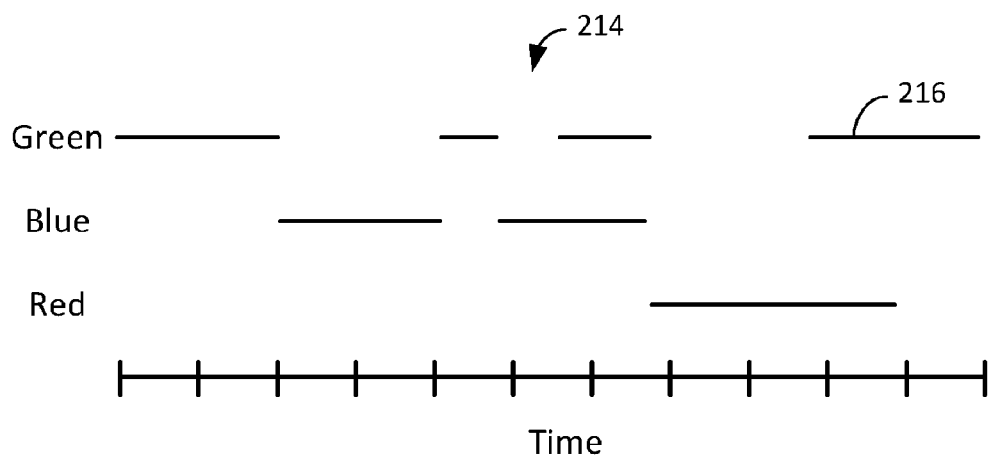
FIG. 7 is a diagram illustrating a second lighting configuration.

Another lighting configuration sequence 214 may be illustrated in FIG. 7. On/off bars 216 may indicate colors for illumination of the target object 108 in a time sequence. As can be seen, some primary colors may be turned on separately, while the specification of more than one color at once may be used to specify secondary colors, such as cyan (blue/green) and yellow (red/green). Obviously, other descriptive mechanisms may be used to describe color, intensity, or patterns for lighting configurations such as a tables. For a single image verification, the configuration represented by any of the illustrated time units may be used for illumination of the target.

Figure 8:
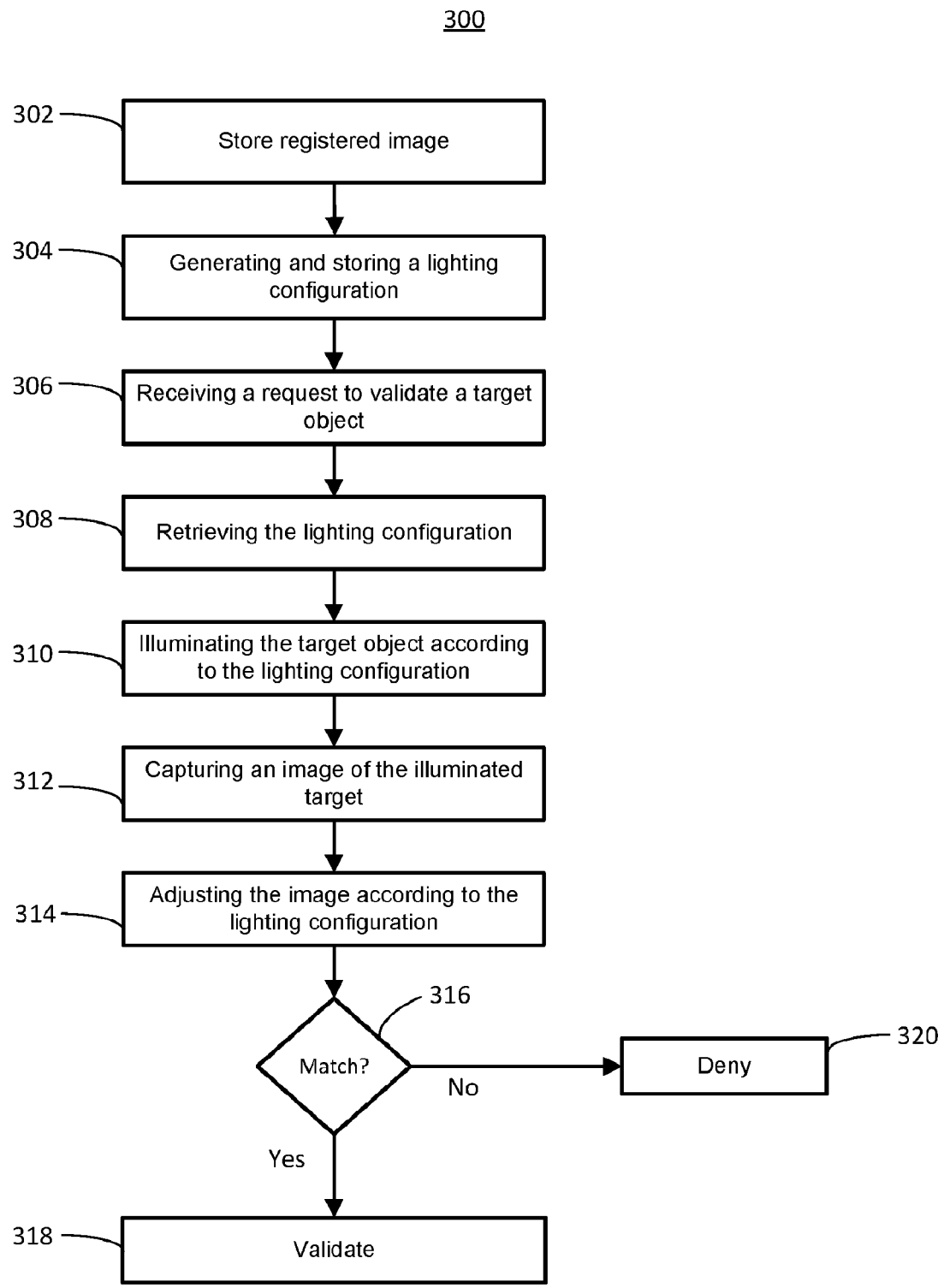
FIG. 8 is a flow diagram of an exemplary method of operating the system of FIG. 1.

FIG. 8 is a flowchart of a method 300 of performing a validation test for a target object 108. In an out of band process, at block 302, an image of the target object 108 may be captured and validated for use in later confirmation of the image. This registered image is the standard by which later validation tests will be performed. At block 304, a lighting configuration may be generated and used in real time or stored for later use. The lighting configuration may specify a light intensity, a color, a source (and therefore a direction) or a combination of these. In situations where the apparatus supports projection, a pattern 202 may be used instead of or in addition to the above variations.

At block 306, a request for validation or authentication of a target object 108 may be received. The request may be processed locally, such as on a smartphone as illustrated in FIG. 4 or may be processed remotely using a server 104 as might be practiced in the store configuration of FIG. 2.

The lighting configuration may be retrieved at block 308. The lighting configuration may retrieved from storage or retrieved at the time of generation. In either case, some element of randomness in the lighting configuration is desired so that the lighting configuration will be difficult or impossible to predict.

At block 310, the target object 108 may be illuminated according to the lighting condition. That is the light source or sources 114, 116, 122 may be set for color, intensity, and pattern, if supported, to illuminate the target object 108 with the selected lighting configuration. At block 312, an image of the target object 108 may be captured using an image sensor 118. The operation of the image sensor 118 may be controlled by the same device, e.g., processor/memory 110 as the lighting sources 114, 116, 122 to ensure coordination of the illumination and the image capture. In an embodiment, the illumination and image capture may be a high speed operation, on the order of a camera flash but in other embodiments, the illumination may last a tangible length so that the target object 108 is aware of the increased security offered by the authentication process and so that an operator, if present, can visibly confirm the illumination process was performed.

At block 314, the captured image may be adjusted according to the lighting configuration. In an embodiment, the image may be processed to remove or minimize the effects of the illumination according to the lighting configuration. As discussed above, this may involve recoloring, lighting adjustments, etc. When the image as captured was actually illuminated as expected, the adjustment to the image should result in a neutral image that may be compared to the registered image. If this comparison passes at block 316, the image, and therefore the target object 108 may be validated so that an appropriate message may be sent at block 318. If the image being presented for validation was not illuminated according to the lighting configuration, or was a still frame image, etc., the adjustment to the image will not result in a neutral image and the matching process at block 316 will fail. If the matching fails, the branch to block 320 may be taken and the request for access or authentication is denied.

A technical problem solved as described in this disclosure is the control of lighting sources 114, 116, 122 and coordination with the image sensor 118 to capture the target object 108 while being illuminated. An additional technical problem solved is the reverse processing of the captured image to remove the expected effects of the lighting configuration at the time of image capture. The higher level technical problem addressed by the invention is spoofing and/or replay attacks on image-based verification processes.

The disclosed apparatus and method benefit both the party attempting the validation and the party granting access or privileges based on the validation/authentication process. By making it more difficult to spoof an image-based validation system whether through man-in-the-middle attacks or simply presenting an image of the supposed target object 108, valuable data is protected whether personal information or financial assets.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of performing a validation test, the method comprising:
   storing a lighting configuration including a combination of colors and light intensity;
   illuminating a target object to be validated according to the lighting configuration;

capturing, at an image sensor, an image of a field of view, the image including the target object as illuminated according to the lighting configuration;

calibrating the image to reverse an effect of the colors and light intensity;

authenticating the target object responsive to the target object in the calibrated image and a registered image matching at or above a threshold level; and providing a validation of the target object responsive to the target object being authenticated.

2. The method of claim 1, further comprising generating the lighting configuration prior to storing the lighting configuration.

3. The method of claim 1, wherein target object is human face.

4. The method of claim 1, wherein storing the lighting configuration comprises storing multiple light configurations and illuminating the target object according to the lighting configuration includes illuminating the target object in a sequence using individual configurations from the multiple light configurations; and wherein the method further comprises repeating the capturing, calibrating, and authenticating steps for each of the multiple light configurations.

5. The method of claim 1, wherein the lighting configuration comprises a pattern that is used to illuminate the target and calibrating the image comprises masking an area of the registered image prior to authenticating the image.

6. A system for performing a validation test comprising:
a processor that executes stored instructions;
a light source under the control of the processor;
a camera coupled to the processor; and
a memory storing data and instructions, the instructions causing the processor to:
illuminate a target object with a lighting configuration, the lighting configuration comprising an irregular black and white checkerboard pattern;
capture an image of the illuminated target object;
mask out an area external to the target object;
compare the lighting configuration with a lighting in the image using only areas of the target object with a white pattern of the irregular black and white checkerboard pattern;
compare the target image with an expected image; and
validate the target image responsive to the lighting configuration matching the lighting in the image and the target image matching the expected image.

7. The system of claim 6, wherein the memory further stores instructions to generate a random lighting configuration.

8. The system of claim 6, wherein the memory stores a pre-configured lighting configuration.

9. The system of claim 6, wherein the comparison of the lighting configuration with the lighting in the image comprises a convolution of one or more of color and intensity between the image and the expected lighting configuration.

10. A method of performing a validation test comprising:
receiving a lighting configuration including a combination of colors and light intensity;
identifying a target object;
illuminating the target object according to the lighting configuration;
capturing an image of the target object illuminated per the lighting configuration;
adjusting the image according to the lighting configuration to reverse an effect of the colors and light intensity;
retrieving a registered image of the target object;
matching the adjusted image to the registered image; and
validating the target object responsive to the adjusted image matching the registered image.

11. The method of claim 10, wherein the target object is a human face.

12. The method of claim 10, wherein the lighting configuration specifies a pattern to be projected on the target object.

13. The method of claim 10, wherein illuminating the target object comprises illuminating the target object with a light source housed in the same device as an image sensor for capturing the image of the target object.

14. The method of claim 10, wherein matching the adjusted image to the registered image uses a SURF algorithm.

* * * * *